(12) United States Patent
Turney et al.

(10) Patent No.: US 11,982,499 B2
(45) Date of Patent: May 14, 2024

(54) HEAT EXCHANGER WITH HEAT TRANSFER AUGMENTATION FEATURES

(71) Applicant: Hamilton Sundstrand Corporation, Charlotte, NC (US)

(72) Inventors: Joseph E. Turney, Amston, CT (US); Kathryn L. Kirsch, Manchester, CT (US); Robert H. Dold, Monson, MA (US); Matthew B. Kennedy, Vernon, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/881,731

(22) Filed: Aug. 5, 2022

(65) Prior Publication Data
US 2024/0044588 A1 Feb. 8, 2024

(51) Int. Cl.
*F28F 1/42* (2006.01)
*B33Y 80/00* (2015.01)

(52) U.S. Cl.
CPC ............... *F28F 1/42* (2013.01); *B33Y 80/00* (2014.12); *F28F 2001/428* (2013.01)

(58) Field of Classification Search
CPC ........ F28F 1/16; F28F 1/22; F28F 1/42; F28F 1/422; F28F 13/12
See application file for complete search history.

(56) References Cited

U.S. PATENT DOCUMENTS

| | | | | |
|---|---|---|---|---|
| 2,905,447 | A * | 9/1959 | Huet | F28F 13/06 165/172 |
| 4,118,944 | A | 10/1978 | Lord et al. | |
| 10,520,263 | B2 | 12/2019 | Lohan et al. | |
| 2001/0032718 | A1 | 10/2001 | Sheerin et al. | |
| 2014/0284038 | A1* | 9/2014 | Vedula | B22F 5/106 165/185 |
| 2016/0116218 | A1 | 4/2016 | Shedd et al. | |
| 2016/0290738 | A1* | 10/2016 | Kupiszewski | F28F 13/12 |
| 2018/0172361 | A1 | 6/2018 | Basini | |

(Continued)

FOREIGN PATENT DOCUMENTS

| | | |
|---|---|---|
| AU | 2015339717 A1 | 6/2017 |
| FR | 1561386 A | 3/1969 |

(Continued)

OTHER PUBLICATIONS

Extended European Search Report for EP Application No. 23176115.6, dated Dec. 4, 2023, 6 pages.

(Continued)

*Primary Examiner* — Eric S Ruppert
(74) *Attorney, Agent, or Firm* — Kinney & Lange, P.A.

(57) ABSTRACT

A heat exchanger includes a plurality of longitudinally-extending first channels and a plurality of second channels fluidly isolated from the plurality of first channels. Each first channels includes a plurality of spiraling internal fins and a plurality of external fins. The internal fins extend from and are integrally formed with the internal walls of the first channel. The external fins connect extend from and are integrally formed with the external walls of the first channels, connecting channels together. The plurality of second channels is defined in part by external walls of the plurality of first channels and the plurality of external fins.

8 Claims, 4 Drawing Sheets

(56) References Cited

U.S. PATENT DOCUMENTS

2021/0031315 A1\* 2/2021 Singh .................. F28F 1/20
2021/0071959 A1   3/2021 Streeter et al.
2021/0189882 A1   6/2021 Hayes

FOREIGN PATENT DOCUMENTS

| GB | 847218 A | \* | 9/1960 |
|----|----------|---|--------|
| JP | H09113168 A | | 5/1997 |
| JP | 4549033 B2 | | 7/2010 |
| JP | 2015102277 A | | 6/2015 |
| SU | 1390511 A1 | \* | 4/1988 |
| WO | 2008118963 A1 | | 10/2008 |

OTHER PUBLICATIONS

Extended European Search Report for EP Application No. 23177031.4, dated Dec. 11, 2023, 7 pages.

\* cited by examiner

HEAT EXCHANGER WITH HEAT TRANSFER AUGMENTATION FEATURES

STATEMENT OF GOVERNMENT INTEREST

This invention was made with government support under Contract No. DE-AR0001342 awarded by United States Department of Energy. The government has certain rights in the invention.

BACKGROUND

Heat exchangers are central to the functionality of numerous systems, including a variety of oil and air-cooling applications, recuperations, and waste heat harvesting for power cycles. These applications continually require increases in heat transfer performance, reductions in pressure loss, and reductions in size and weight. Current heat exchanger offerings are dominated by plate fin constructions, with tube shell and plate-type heat exchangers having niche applications. Heat transfer rates decrease as fluid flows down the length of a channel. There are several methods of augmenting heat transfer, one of which is to increase the surface area of a material that a flowing fluid contacts. Fins are used within channels to increase surface area without altering the external dimensions of the channel itself. However, traditional plate-fin construction imposes design constraints that inhibit performance, increase size and weight, results in structural reliability issues, make it unfeasible to meet future high temperature applications, and limit system integration opportunities. Other known enhancement techniques include twisted tapes and wire coils that are inserted into the channel and serve the same function as fins. Simply increasing fin size or number of fins to maximize surface area and augment heat transfer can result in designs that are too heavy and inefficient, and inserts suffer from similar shortcomings as well as increased wear and tear. There is a need for heat exchanger heat transfer augmentation features that are designed for and able to withstand high pressure and temperature applications using characteristics besides increased fin size, and for designs providing increased heat transfer performance, reduced pressure losses, and reduced size and weight.

SUMMARY

A heat exchanger includes a plurality of longitudinally-extending first channels and a plurality of second channels fluidly isolated from the plurality of first channels. Each first channel includes a plurality of internal fins and a plurality of external fins. The internal fins extend from and are integrally formed with the internal walls of the first channel. The internal fins have a spiraling orientation along the internal wall. The external fins connect adjacent first channels. The plurality of second channels is defined at least in part by external walls of the plurality of first channels and the plurality of external fins.

The present summary is provided only by way of example, and not limitation. Other aspects of the present disclosure will be appreciated in view of the entirety of the present disclosure, including the entire text, claims and accompanying figures.

DETAILED DESCRIPTION

The present disclosure is directed to an additively manufactured heat exchanger core with channel configurations having various internal and external fin arrangements designed to augment heat transfer. The disclosed heat exchanger core configurations are applicable to counterflow heat exchanger designs and are specifically suited for application in supercritical $CO_2$ cycles, which operate at high pressure and depend heavily on heat transfer for cycle efficiency. Channel configurations and internal fins in each fluid channel can be additively manufactured in orientations, arrangements, and shapes to augment heat transfer. The present application discloses several embodiments of additively manufactured channel and internal fin design and arrangement that utilizes surface area, shape, and orientation to improve rates of heat transfer.

Additive manufacturing processes can produce highly complex parts quickly and efficiently and can permit modifications to design specifications of a desired pail, for example by modifying CAD specifications, without re-tooling casting or machining equipment used for traditional, subtractive manufacturing processes. Additive manufacturing allows complex design features to be incorporated into parts where those complex design features had proved infeasible using previous manufacturing techniques. While the disclosed heat exchanger cores have been developed using direct metal laser sintering, other additive manufacturing techniques may be employed, such as, for example, electron beam melting, electron beam powder bed fusion, laser powder deposition, directed energy deposition, wire arc additive process, electron beam wire, and selective laser sintering, as well as other powder bed methods in general. Powder bed methods work well with metals as well as plastics, polymers, composites and ceramics. Additive manufacturing allows for the manufacture of channels with complex internal fin geometries and arrangements that can be integrally formed with channel walls to provide for uninterrupted heat conduction.

Figure 1:
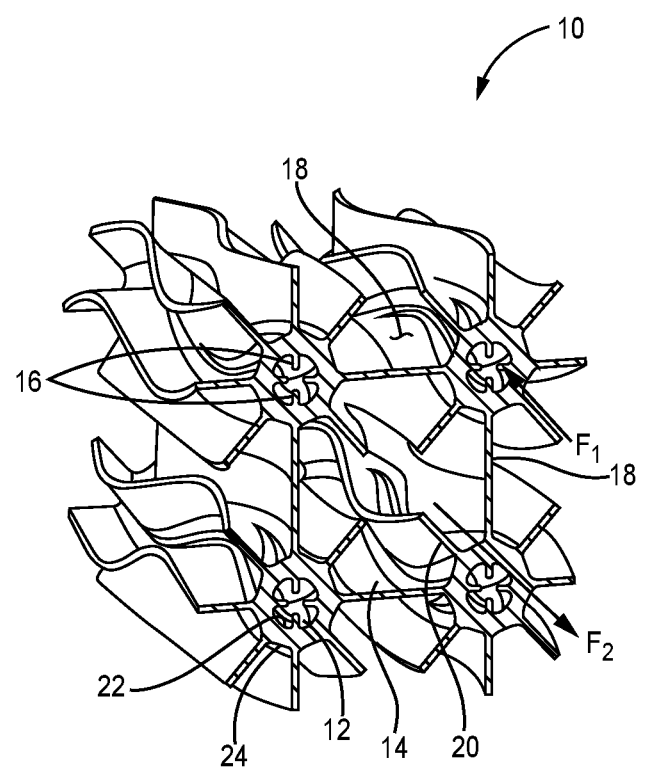
FIG. 1 is a perspective view of one embodiment of a heat exchanger core.

FIG. 1 is a perspective view of a segment of a counterflow heat exchanger core. FIG. 1 shows heat exchanger core segment 10 with fluid channels 12 and 14, internal fins 16, external fins 18 and 20, internal walls 22, external walls 24, and fluids $F_1$ and $F_2$. A first fluid circuit is defined by fluid channels 12 and is configured to deliver $F_1$ along a length of channels 12 as illustrated by the direction of the arrow depicting a flow of fluid $F_1$, substantially axially with respect to channel 12. Internal fins 16 are disposed in a fluid flow path in channels 12. Adjacent channels 12 are joined by external fins 18 forming a second fluid circuit therebetween. Channels 14 are defined in part by external walls 24 of channels 12 and external fins 18. External fins 20 extend into channels 14. Fluid $F_2$ is delivered in an opposite direction from fluid $F_1$ in channels 14 as illustrated by the direction of the arrow depicting a flow of fluid $F_2$. Internal fins 16 in channels 12 and external fins 18 and 20 in channels 14 augment heat transfer between fluids $F_1$ and $F_2$. Channels 12 and channels 14 are fluidly isolated. It will be understood by one of ordinary skill in the art that heat exchanger core segment 10 can be produced in any number of repeating units or subunits thereof to produce a heat exchanger core of a desired shape and size.

Channels 12 extend longitudinally (i.e. axially), as illustrated in FIG. 1. Channels 12 can have a generally circular cross-section. (i.e., channels 12 can be cylindrical tubes) to accommodate pressurized fluids. In other embodiments, channels 12 can have other shapes to optimize fluid flow dynamics and heat transfer. Channels 12 are configured to transmit a cooling fluid and channels 14 are configured to transmit a heating fluid but in other embodiments the two may be reversed. In illustrative embodiments, channels 12 can be configured to transmit supercritical $CO_2$ and channels 14 can be configured to transmit air.

Internal fins 16 can be disposed in channels 12 to increase convective surface area and augment heat transfer between fluids $F_1$ and $F_2$. Internal fins 16 can be integrally formed with internal walls 22 of channels 12 and can be arranged in a spiraling orientation along the flow length. Internal fins 16 can be connected to internal walls 22 by a fillet. The shape and orientation of internal fins is discussed with respect to FIGS. 3A-3C. The incorporation of internal fins 16 can increase surface area without altering the external dimensions of channels 12 or channels 14. The shape, size, and orientation of internal fins 16 have effects on flow, boundary layer, and heat transfer rate.

Channels 12 are connected to adjacent channels 12 by external fins 18. External fins 18 can extend from and can be integrally formed with external walls 24 of channels 12 to provide uninterrupted conductive heat transfer. External fins 18 are integrally formed with channels 12. External fins 18 can be connected to external walls 24 of channels 12 by a fillet. External fins 18 that connect adjacent channels 12 are longer than external fins 20 and can extend twice the length of external fins 20. In other embodiments, the connecting external fins 18 may be more than twice the length of external fins 20 or less than twice the length to optimize fluid dynamics and heat transfer. As illustrated in FIG. 1, four adjacent channels 12 are connected to each other by external fins 18 to define each channel 14. In other embodiments, less than four or more than four adjacent channels 12 can be connected by external fins 18 to define channels 14 of different shapes. External fins 20 are integrally formed with external walls 24 of channels 12 and extend into channels 14. External fins 20 are disposed between adjacent external fins 18. As illustrated in FIG. 1, four external fins 20 extend into each channel 14. In other embodiments, more or less external fins 20 than those illustrated in FIG. 1 may extend into each channel 14. Channels 12 can have diameters and wall thickness designed for particular applications. For example, channels 12 can be designed with wall thicknesses and cross-sectional diameters to accommodate pressurized fluids (e.g., supercritical $CO_2$). In some embodiments, walls of channels 12 can have a thickness greater than a thickness of external fins 18 to accommodate pressurized fluids in channels 12.

Channels 14 extend longitudinally and are defined by external walls 22 of channels 12 and external fins 18. Each channel 14 is disposed between adjacent channels 12 and external fins 18 such that channels 12 and external fins 18 surround each channel 14. Heat is transferred between fluid $F_1$ and fluid $F_2$ by external walls 24 of channels 12 and external fins 18 and 20. As illustrated in FIG. 1, external fins 18 are wavy, undulating in the form of a sine wave oscillation along a length of channel 12 but disposed perpendicular to an axis of channels 12 such that in the cross-sectional view, form a straight line between adjacent channels 14. External fins 18 together with circular channels 12 form a box-like shape defined by adjacent sides joined by rounded concave corners. The cross-sectional shape of channel 14 changes along the length of channel 12 due to the oscillation of the wavy external fins 18. For example, the cross-sectional view in FIG. 1 shows external fins 18 disposed at a midpoint of channels 12, but the location of the intersection of external fins 18 and external wall 24 changes along the length of channels 12. In other embodiments, the shape of channels 14 may be different, corresponding to alternative shapes and arrangements of external fins 18 and channels 12.

External fins 20 extend from and are integrally formed with channels 12 and protrude into channel 14. External fins 20 can be connected to channels 12 by a fillet. External fins 20 act as internal fins to channel 14. As illustrated in FIG. 1, external fins 20 can be wavy, undulating in the form of a sine wave oscillation. The shape of external fins 20 can match the shape of external fins 18. External fins 18 and 20 can have a wavy shape in a form different than that of a sine wave oscillation and in other embodiments. The wavy shape increases the surface area available for heat transfer without modifying the external dimensions of channels 14.

The disclosed internal and external fin orientations and configurations can provide improved heat transfer in counter-flow heat exchanger applications. The internal fins 16 and external fins 18 and 20 are integrally formed with channel walls to provide uninterrupted conductive heat transfer. The spiraling and wavy shapes of the internal fins 16 and external fins 18 and 20 augment heat transfer by increasing the heat transfer coefficient. The spiraling and wavy shapes of internal fins 16 and external fins 18 and 20 create a more turbulent flow which allows for heat transfer through both conduction and convection. The spiraling internal fins of channel 12 provide advantage for two phase fluid flow by forcing liquid toward the channel wall while vapor collects in the center, enhancing heat transfer. The wavy shapes of external fins 18 and 20 increase impingement of fluid on fins 18 and 20 to enhance heat transfer. The shape and orientation of the internal fins 16 and external fins 18 and 20 allows for augmented heat transfer without modifying the external dimensions of channels 12 and 14.

Figure 2A:
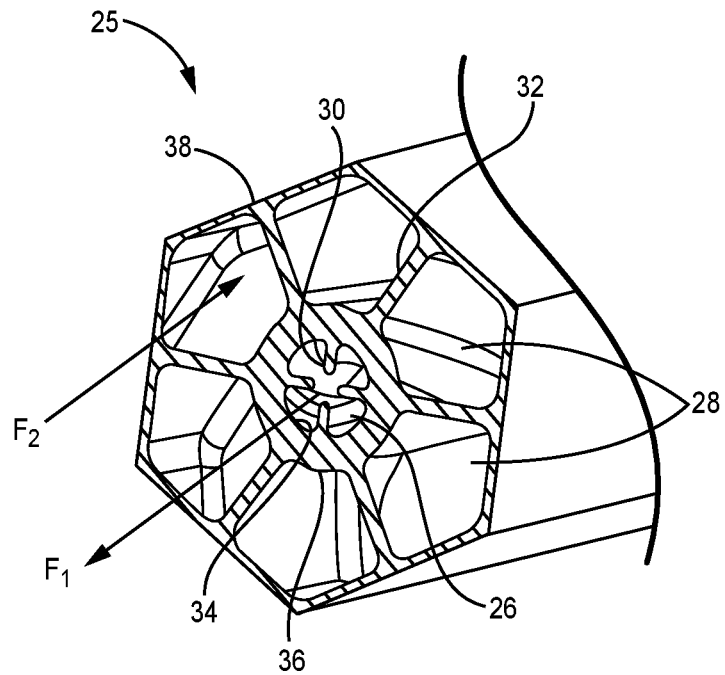
FIG. 2A is a perspective view of a segment of another embodiment of a heat exchanger core.
Figure 2B:
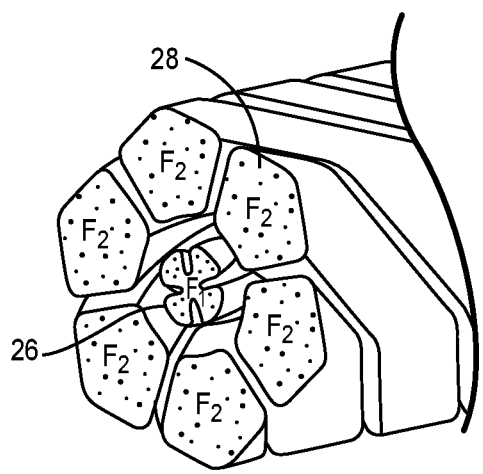
FIG. 2B is a perspective view of a fluid flow in the heat exchanger core segment of FIG. 2A with a channel, internal fins, external fins, and an outer wall removed.

FIG. 2A is a perspective view of another heat exchanger core segment. FIG. 2A shows segment 25 of a heat exchanger core, including fluid channels 26 and 28, internal fins 30, external fins 32, internal wall 34, external wall 36, outer wall 38, and fluids $F_1$ and $F_2$. FIG. 2B is a perspective view of a fluid flow through channels 26 and 28 with a wall of channel 26, internal fins 30, external fins 32, and outer wall 38 removed. FIGS. 2A and 2B are discussed together. It will be understood by one of ordinary skill in the art that heat exchanger core segment 25 can be produced in any number of repeating units or subunits thereof to produce a heat exchanger core of a desired shape and size.

A first fluid circuit is defined by fluid channel 26 and configured to deliver fluid $F_1$ along a length of channels 26, as illustrated by the direction of the arrow depicting a flow of fluid $F_1$ in FIG. 2, substantially axially with respect to channel 26. Internal fins 30 are disposed in a fluid flow path in channel 26. External fins 32 extend from external wall 36 of channel 26 and are joined to outer wall 38, forming channels 28 of a second fluid circuit. Channels 28 are defined by external wall 36 of channel 26, external fins 32, and outer wall 38. Fluid $F_2$ is delivered in an opposite direction from fluid $F_1$, as illustrated in FIG. 2 by the direction arrow depicting a flow of fluid $F_2$, in channels 28. Internal fins 30 augment heat transfer between fluids $F_1$ and $F_2$. Channel 26 and channels 28 are fluidly isolated. Multiple segments 25 can be joined to form a heat exchanger core. Outer walls 38 of adjacent segments 25 can be shared or integrally formed.

Channel 26 extends longitudinally (i.e. axially). Channel 26 can have a generally circular cross-section (i.e. channel 26 can be a cylindrical tube). In other embodiments, channel 26 can have other shapes to optimize fluid flow dynamics and heat transfer. Channel 26 can be configured to transmit a cooling fluid and channels 28 can be configured to transmit a heating fluid but in other embodiments the two may be reversed. For example, channel 26 can be configured to transmit supercritical $CO_2$ and channels 28 can be configured to transmit air. Channel 26 is disposed such that channels 28 surround channel 26.

Channel 26 has internal fins 30. Internal fins 30 are integrally formed with and extend from internal walls 34 of channel 26. Internal fins 30 can be arranged in a spiraling orientation along internal walls 34. Channel 26 can have diameters and wall thickness designed for particular applications. For example, channel 26 can be designed with wall thicknesses and cross-sectional diameters to accommodate pressurized fluids (e.g., supercritical $CO_2$). In some embodiments, walls of channel 26 can have a thickness greater than a thickness of external fins 32 to accommodate pressurized fluids in channel 26.

Internal fins 30 can be disposed in channel 26 to increase convective surface area and augment heat transfer between fluids $F_1$ and $F_2$. Internal fins 30 can be integrally formed with internal walls 34 of channel 26 and can be arranged in a spiraling orientation along internal wall 24 of channel 26 along the flow length. Internal fins 30 can be connected to internal walls 34 of channel 26 by a fillet. The incorporation of internal fins 30 can increase surface area without altering the external dimensions of channels 26 or channels 28. The shape, size, and orientation of internal fins 30 have effects on flow, boundary layer, and heat transfer rate.

External fins 32 extend from and are integrally formed with external walls of 36 of channel 26 and outer wall 38. External fins 32 can be connected to outer walls 36 of channel 26 by a fillet and connected to outer wall 38 by a fillet. External fins 32 wind or spiral around channel 26. The arrangement of channels 26 and 28 and outer wall 38 in segment 25 can form a polygonal shape. As illustrated in FIG. 2A, a cross-section of segment 25 can be a hexagon but need not be limited to that shape. The combined shape of channels 26 and 28 to form segment 25 can vary depending on the number of external fins 32 provided on channels 26. As illustrated in FIG. 2A, six external fins 32 extend from channel 26 to form six channels 28. In other embodiments, there may be more or less channels 28 than those illustrated in FIG. 2A to optimize heat transfer.

Channels 28 extend longitudinally and are defined by external walls 36 of channel 26, external fins 32, and outer wall 38. Heat is transferred between fluid $F_1$ and fluid $F_2$ by external walls 36 of channel 26 and external fins 32. Adjacent channels 28 are separated by external fins 32. External fins 32 form sidewalls of channels 28 and connect to outer wall 38, which forms an additional sidewall of channels 28. External fins 32 spiral around channel 26 along the length of channel 26 thereby forming spiraling channels 28. FIG. 2B is a perspective view of the fluid flow through segment 25 of FIG. 2A without channel 26 walls, internal fins 30, external fins 32, and outer wall 38. As illustrated in FIG. 2B, the fluid in channels 28 spirals around the fluid in channel 26. Channels 28 can have cross-sectional areas and wall thicknesses designed for particular applications. For example, channels 28 can be designed with wall thicknesses and cross-sectional areas to accommodate to promote heat transfer.

The disclosed internal and external fin orientations and configurations can provide improved heat transfer in counter-flow heat exchanger applications. Internal fins 30 and external fins 32 are integrally formed with channel walls to provide uninterrupted conductive heat transfer. The spiraling shapes of the internal fins 30 and external fins 32 augment heat transfer by increasing the heat transfer coefficient. The spiraling shape creates a more turbulent flow which allows for heat transfer through both conduction and convection. The spiraling shape of internal fins 30 of channel 26 also provides advantage for two phase fluid flow by forcing liquid toward the channel wall while vapor collects in the center, enhancing heat transfer. The shape and orientation of the internal fins 30 and external fins 32 allows for augmented heat transfer without further modifying the external dimensions of channels 26 and 28.

Figure 3A:
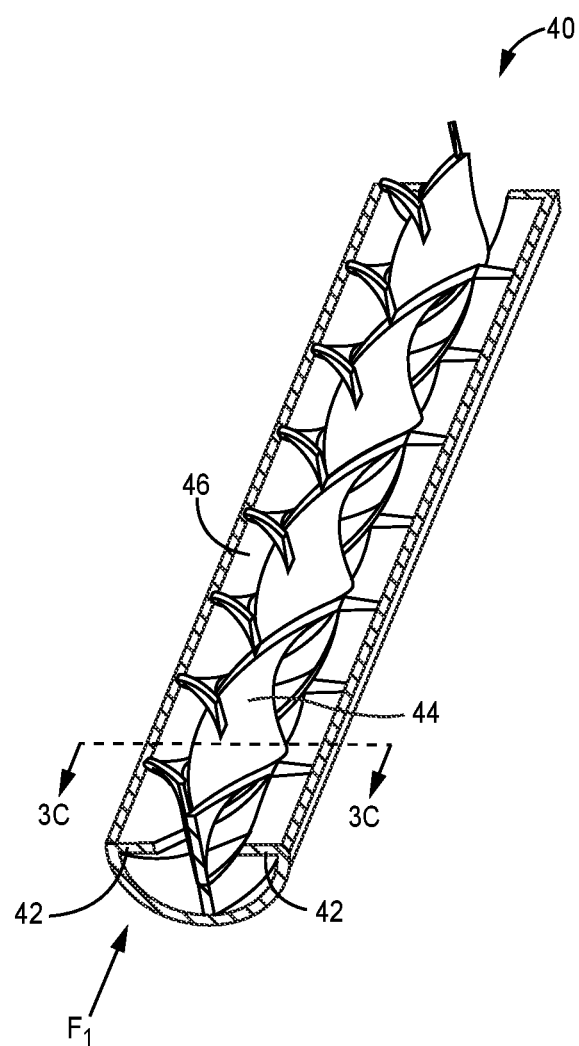
FIG. 3A is a cutaway perspective view of a heat exchanger channel.
Figure 3B:
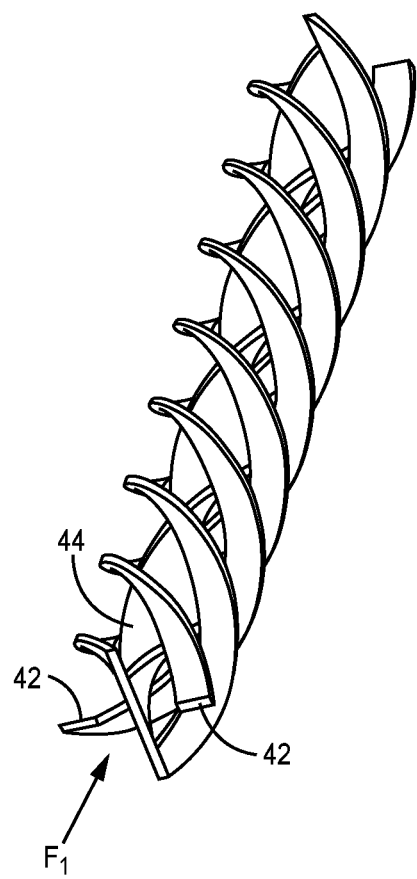
FIG. 3B is a perspective view of internal fins of the heat exchanger channel of FIG. 3A.
Figure 3C:
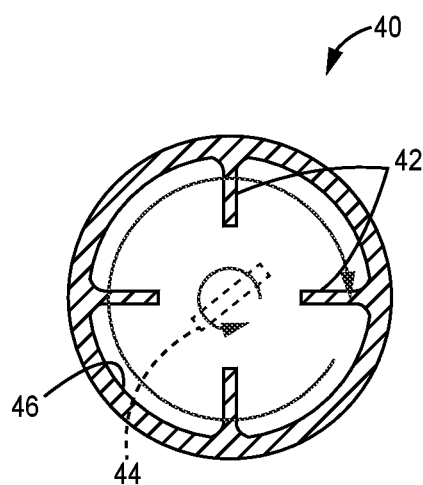
FIG. 3C is a cross-sectional view of the heat exchanger channel of FIG. 3A taken along the 3C-3C line of FIG. 3A.

FIGS. 3A-3C illustrate different internal fin designs for use in channel 12 of heat exchanger core 10 of FIG. 1 or channel 26 of heat exchanger core segment 25 of FIG. 2A.

FIGS. 3A-3C show different views of channels 40 with internal fins 42 and optional internal fin 44 (shown in phantom). All channels 40 have the same configuration. Channel 40 can be configured to transmit fluid $F_1$ in a flow direction illustrated by the arrow, substantially axially with respect to channel 40. FIG. 3A is a cutaway perspective view of channel 40. FIG. 3B is a perspective view of internal fins 42 and 44 without the channel walls. FIG. 3C is an enlarged cross-sectional view of channel 40 taken along the 3C-3C line of FIG. 3A. As illustrated in FIGS. 3A-3C, internal fins 42 are disposed in a spiraling orientation along internal wall 46 of channel 40 and internal fin 44 is twisted and disposed in a center of channel 40. The arrows in FIG. 3C indicate a direction in which internal fins 42 spirals along internal walls 46 and a direction in which internal fin 44 twists. FIGS. 3A-3C are discussed together.

As illustrated, channel 40 extends longitudinally (i.e. axially) and can have a generally circular cross-section (i.e. channel 26 can be a cylindrical tube). Channel 40 can be configured to transmit a heating fluid. Internal fins 42 extend from and are integrally formed with internal walls 46 of the channel 40. Optional internal fins 44 connect to and are integrally formed with internal fins 42.

Internal fins 42 are arranged in a spiraling orientation along internal wall 46 and can extend the length of channel 40. FIG. 3C shows four internal fins 42 spaced equal distances from each other along a circumference of channel 40. In other embodiments, there may be more than four internal fins 42 or fewer than four internal fins 42. Internal fins 42 can also have unequal spacing along internal wall 46 of channel 40 in other embodiments. Internal fins 42 extend into channel 40. A width of internal fins 42 or distance to which internal fins 42 extend from internal wall 46 into channel 40 can vary. In some embodiments, internal fins can have a width less than half a diameter of channel 40 or less than one-third the diameter of channel 40, for example, as illustrated in FIGS. 3A and 3C. Internal fins 42 can provide a distinct advantage for two-phase flow applications such as supercritical $CO_2$ cycles. Internal fins 42 can drive the liquid phase of the fluid toward internal walls 46, which promotes heat transfer, and allow the vapor, which is a less effective heat transfer medium, to collect in the center.

In some embodiments, internal fin 44 can be disposed in a center of channel 40 between internal fins 42. Internal fin 44 is optional and can be excluded in some embodiments. Internal fin 44 can be twisted and extend the length of channel 40. Internal fin 44 is disposed between internal fins 42 and is connected to internal fins 42 at varying locations along the length of channel 40. As illustrated in FIG. 3C, internal fin 44 can twist in an opposite direction of the spiraling orientation of internal fins 42. As internal fin 44 twists, it connects to discrete locations on internal fins 42, as illustrated in FIG. 3A.

The spiraling and twisted shapes of internal fins 42 and 44 augment heat transfer by increasing the heat transfer coefficient. The shape of internal fins 42 and 44 also creates a more turbulent flow which allows for heat transfer through both conduction and convection. The twisted shapes provide advantages for two phase fluid flow by forcing liquid toward the channel wall while vapor collects in the center, enhancing heat transfer. The shape and orientation of internal fins 42 and 44 in this embodiment allows for augmented heat transfer without modifying external dimensions of channels 12 and 26.

DISCUSSION OF POSSIBLE EMBODIMENTS

The following are non-exclusive descriptions of possible embodiments of the present invention.

A heat exchanger includes a plurality of first channels extending longitudinally and a plurality of second channels. Each first channel includes a plurality of first internal fins and a plurality of external fins. The first internal fins extend from and are integrally formed with an internal wall and are arranged in a spiraling orientation. The external fins extend from and are integrally formed with an external wall. The plurality of second channels is defined in part by the external walls of the plurality of first channels and the plurality of external fins. The plurality of second channels is fluidly isolated from the plurality of first channels.

The heat exchanger of the preceding paragraph can optionally include, additionally, and/or alternatively, any one or more of the following features and/or configurations:

A further embodiment of the heat exchanger of the preceding paragraphs, wherein the heat exchanger is additively manufactured.

A further embodiment of the heat exchanger of any of the preceding paragraphs, wherein each first channel has a circular cross-section.

A further embodiment of the heat exchanger of any of the preceding paragraphs, wherein the plurality of external fins includes first external fins and second external fins, wherein the first external fins connect adjacent first channels.

A further embodiment of the heat exchanger of any of the preceding paragraphs, wherein the first and second external fins have an undulating shape extending a length of each first channel.

A further embodiment of the heat exchanger of any of the preceding paragraphs, wherein the second external fins protrude into the plurality of second channels A further embodiment of the heat exchanger of any of the preceding paragraphs, wherein the first internal fins extend less than a full width of each first channel.

A further embodiment of the heat exchanger of any of the preceding paragraphs, wherein the first internal fins are circumferentially spaced about the internal wall and extend the length of each first channel.

A further embodiment of the heat exchanger of any of the preceding paragraphs, wherein each first channel further includes a twisted center fin.

A further embodiment of the heat exchanger of any of the preceding paragraphs, wherein the twisted center fin is disposed between and is connected to the first internal fins.

A further embodiment of the heat exchanger of any of the preceding paragraphs, wherein external fins of the plurality of external fins form sidewalls of each second channel and wherein the plurality of second channels further includes an outer wall, wherein the outer wall connects the plurality of external fins.

A further embodiment of the heat exchanger of any of the preceding paragraphs, wherein the external fins spiral around each first channel to form a plurality of spiraling fluid flow paths around each first channel.

A further embodiment of the heat exchanger of any of the preceding paragraphs, wherein the outer wall connecting the plurality of external fins of each first channel has a polygonal shape.

A further embodiment of the heat exchanger of any of the preceding paragraphs, wherein walls of the plurality of first channels have a thickness greater than a thickness of the external fins.

A further embodiment of the heat exchanger of any of the preceding paragraphs, wherein the first internal fins extend less than a full width of each first channel.

A further embodiment of the heat exchanger of any of the preceding paragraphs, wherein the first internal fins are circumferentially spaced about the internal wall and extend the length of each first channel.

A further embodiment of the heat exchanger of any of the preceding paragraphs, wherein each first channel further includes a twisted center fin.

A further embodiment of the heat exchanger of any of the preceding paragraphs, wherein the twisted center fin is disposed between and is connected to the first internal fins.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A heat exchanger comprising;
   a plurality of first channels extending longitudinally, each first channel comprising;
      a plurality of first internal fins extending from and integrally formed with an internal wall of each first channel, wherein first internal fins of the plurality of internal fins are arranged in a spiraling orientation along the internal wall; and
      a plurality of external fins extending from and integrally formed with an external wall of each first channel, wherein the plurality of external fins includes first external fins and second external fins, the first and second external fins having an undulating shape extending a length of each first channel, wherein each first external fin is disposed between second external fins, and where the first external fins connect adjacent first channels;

a plurality of second channels, each second channel defined by the external walls of the plurality of first channels and the first external fins, wherein the plurality of second channels is fluidly isolated from the plurality of first channels and wherein and the second external fins protrude into the plurality of second channels.

2. The heat exchanger of claim 1, wherein the heat exchanger is additively manufactured.

3. The heat exchanger of claim 2, wherein each first channel has a circular cross-section.

4. The heat exchanger of claim 1, wherein the first internal fins extend less than a full width of each first channel.

5. The heat exchanger of claim 4, wherein the first internal fins are circumferentially spaced about the internal wall and extend the length of each first channel.

6. The heat exchanger of claim 5, wherein each first channel further comprises a twisted center fin.

7. The heat exchanger of claim 6, wherein the twisted center fin is disposed between and is connected to the first internal fins.

8. The heat exchanger of claim 3, wherein walls of the plurality of first channels have a thickness greater than a thickness of the external fins.

* * * * *